Figure 1:
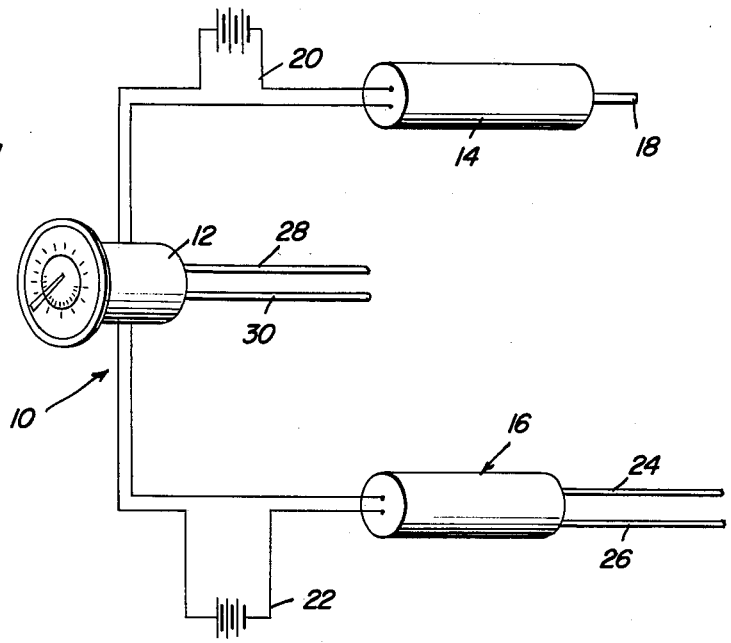

Sept. 24, 1963

I. U. SUITS ETAL 3,104,547

AIR SPEED INDICATOR

Filed June 24, 1960

3 Sheets-Sheet 1

Irvin U. Suits
Donald J. Thompson
INVENTORS

BY *Clarence A. O'Brien*
*and Harvey B. Jacobson*
Attorneys

Sept. 24, 1963    I. U. SUITS ETAL    3,104,547
AIR SPEED INDICATOR

Filed June 24, 1960    3 Sheets-Sheet 3

Irvin U. Suits
Donald J. Thompson
INVENTORS

BY *Clarence A. O'Brien and Harvey B. Jacobson*
Attorneys

United States Patent Office 3,104,547
Patented Sept. 24, 1963

3,104,547
AIR SPEED INDICATOR
Irvin U. Suits and Donald J. Thompson, Raiford, Fla., assignors of thirty percent to Franklin H. Suits, Sr., and Elva Faye Urton Suits, jointly, and ten percent to Herman R. Bauer, Raiford, Fla.
Filed June 24, 1960, Ser. No. 38,561
14 Claims. (Cl. 73—181)

This invention relates to indicators and more particularly to a true air speed, direct reading indicator to facilitate navigation and flying of the various types and classes of aircraft.

An object of the invention is to provide a direct reading true air speed instrument capable of being used with all aircraft as an important part of the instrumentation.

An important feature of the instrument is that it provides numerous condition indications that are useful during take-off, landing, climbing, cruising and/or descending. The instrument in accordance with the invention automatically yields information of both indicated air speed and true air speed making the instrument a flight attitude instrument. The instrument is extremely useful during instrument flight conditions in bad weather, since the true air speed is the pilot's theoretical ground speed when the wind information is unknown. Instrument flights according to FAA regulations as amended in 1955, are based on true air speed. Therefore the instrument of the invention is a navigational instrument designed for all types of dead reckoning navigation and is particularly useful in high altitude long range pressure pattern flying.

Density-altitude information is provided by the instrument for determining take-off distances required. This feature is particularly important in cargo helicopter flight where the density-altitude versus gross weight is an important factor in this category or class of aircraft. The information provided by the density-altitude reading of the instrument is also highly important in jet aircraft as well as heavy transport aircraft.

Another feature of the invention is a certain condition pointer which is manually adjustable by the pilot. This pointer is movable with respect to the true air speed dial and is adapted to be adjusted by the pilot prior to take-off so that there will always be a quick, ready reference for the pilot's information.

Briefly, the invention is embodied in instruments which are equipped with a pressure responsive transducer and a temperature responsive transducer together with means for summarizing the outputs of the two transducers and applying the summarized information to the true air speed dial in the form of an adjustment. The pointer of the instrument is operated by a conventional air speed instrument mechanism and would ordinarily yield indicated air speed. However when the pointer is read with relation to the graduations of the true air speed dial whose position is corrected in accordance with the temperature and pressure transducing devices, true air speed is actually directly readable on the face of the instrument.

There are a number of different ways for obtaining the desired results of dial (or pointer) movement to respond to differences in temperature and pressure that are experienced in normal and extraordinary flight. In order to show one possible way of achieving these results, a specific embodiment of the invention is shown in the accompanying drawings. However, it is to be clearly understood that the illustration is to be construed as merely one example of practicing the invention and not to be construed as a limitation on possible embodiments, modifications and methods and ways of achieving the practice of the invention.

Figure 2:
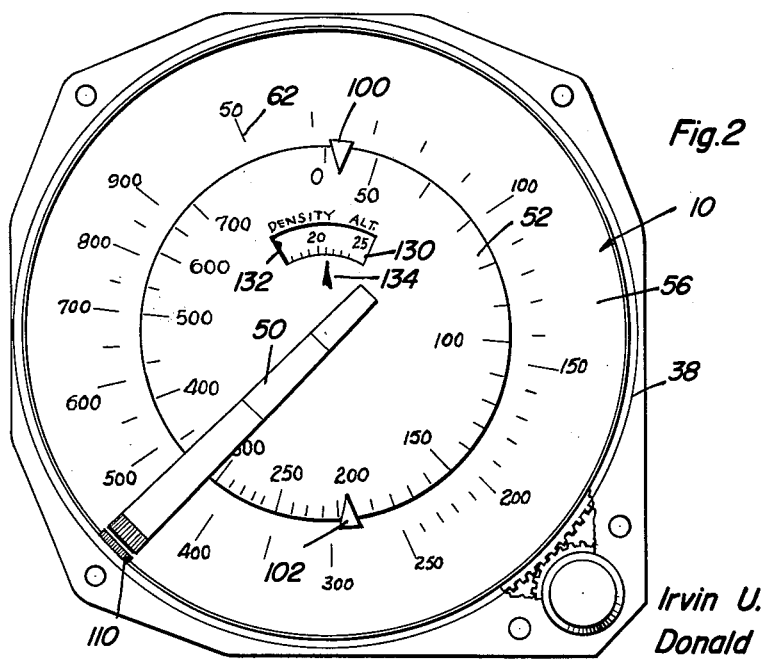
Figure 3:
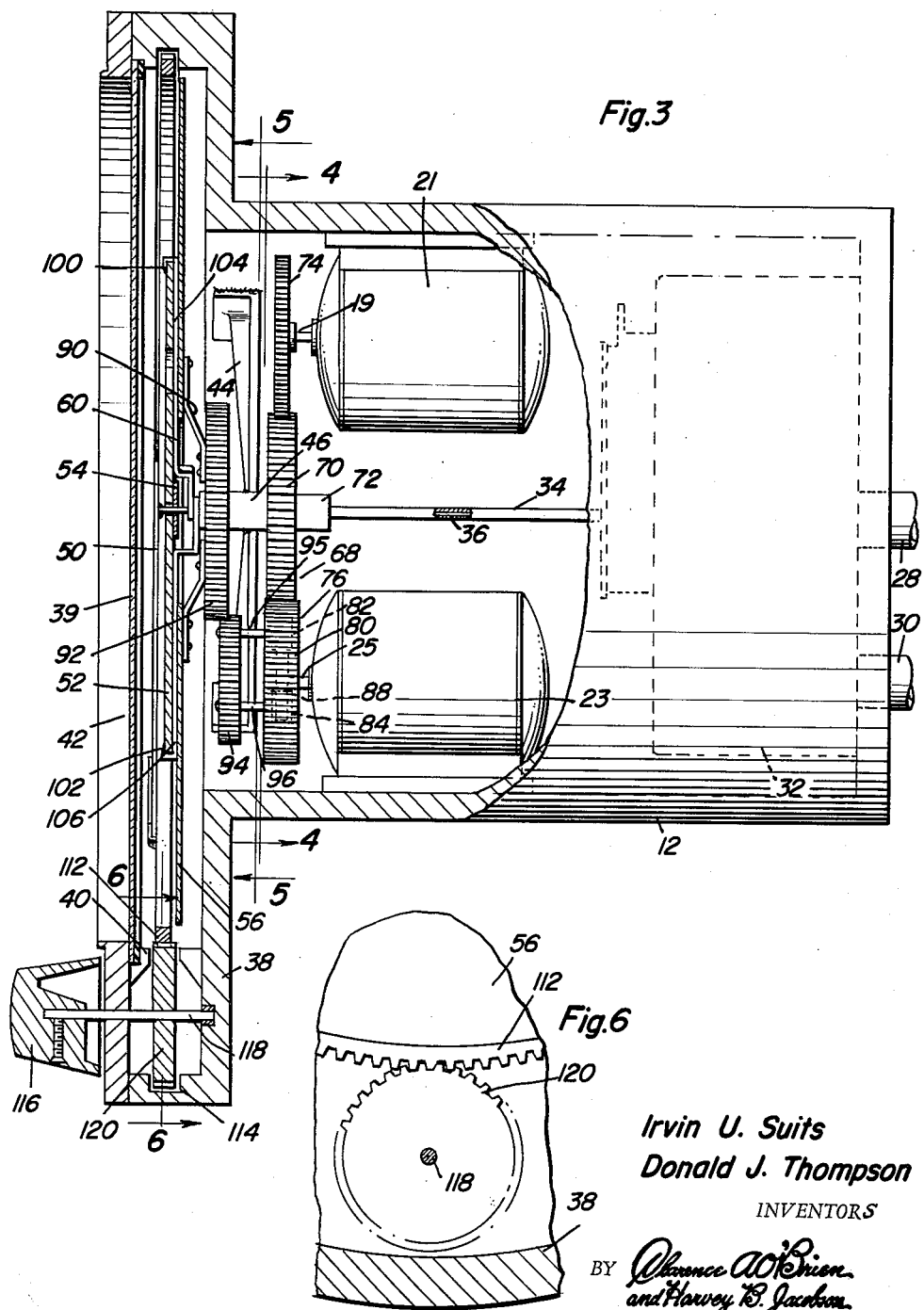
Figure 4:
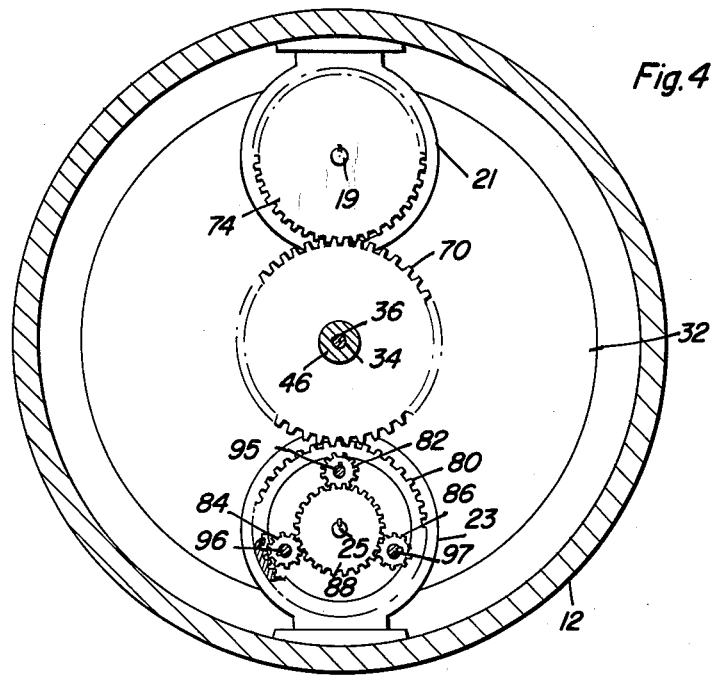
Figure 5:
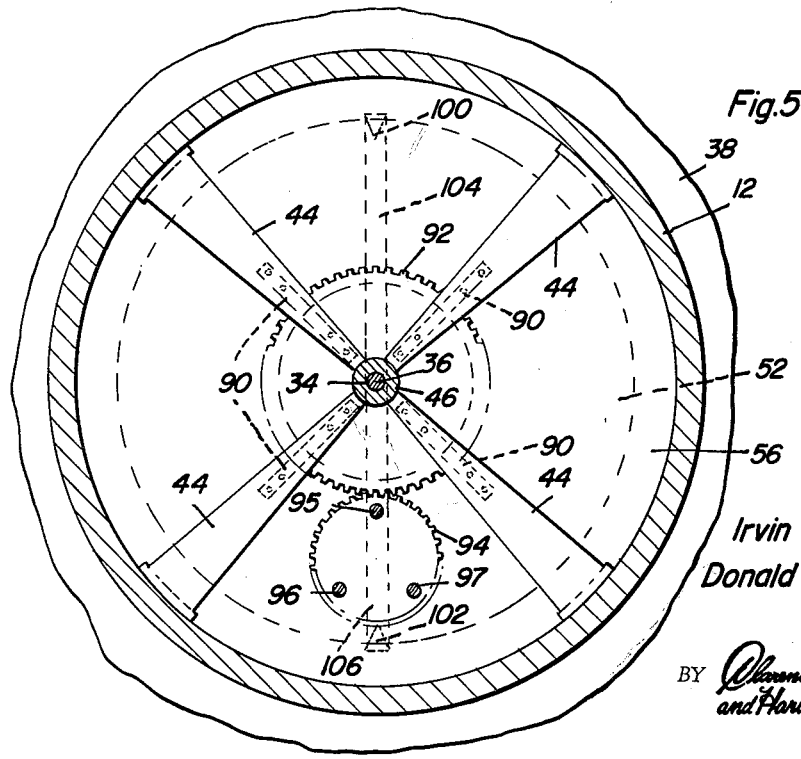

In the drawings:
FIGURE 1 is a diagrammatic view showing the instrument together with the various inputs thereof.
FIGURE 2 is a front elevational view of the instrument.
FIGURE 3 is a side elevational view of the instrument, parts broken away to illustrate otherwise obscure details.
FIGURE 4 is a sectional view taken on the line 4—4 of FIGURE 3.
FIGURE 5 is a sectional view taken on the line 5—5 of FIGURE 3.
FIGURE 6 is an enlarged sectional view taken on the line 6—6 of FIGURE 3.

In the accompanying drawings reference is first made to FIGURE 1 showing the instrument 10 in purely diagrammatic form. The instrument has an instrument case 12 and two conventional transducers 14 and 16 electrically therewith. Transducer 14 is a temperature transducer having a temperature sensing element 18 and an electrical potential source circuit 20 connected therewith. Transducer 16 has a similar electrical circuit 22 connected therewith, and flight level pressure tubes 24 and 26. Pitot input tubes 28 and 30 are connected with case 12 and more particularly to an air speed mechanism 32 (FIGURE 3) in case 12 whereby differential pressure heads resulting from movement of the aircraft reflects such movement without accounting for changes in static pressure and temperature of the air. The air speed mechanism is purely conventional and has been commercially available for a number of years. A usual type of mechanism 32 is an aneroid bellows operated air speed mechanism having a stationary bearing shaft 34 together with a rotatable needle shaft 36 connected therewith.

Referring now principally to FIGURES 3-5, it will be seen that for convenience, case 12 has a large cylindrical front part 38 with a glass face 39 suitably held, for instance by clips 40, brackets or the like, across the frontal opening 42 of the case. The previously mentioned stationary bearing 34 is supported in case 12 by mounting brackets 44 attached to the side walls of the case and equipped with a boss 46 at the center thereof and to which the stationary bearing 34 is secured. The needle shaft 36 extends through the stationary bearing 34 and has a pointer 50 secured to the outer end thereof, it being understood that any form of pointer or indicator may be used. Pointer 50 traverses face 52 which is graduated to provide information concerning indicated air speed. Consequently, face 52 which is suitably held in a fixed position, for instance by a bracket 54 in case part 38, the pointer 50, needle shaft 36 and air speed mechanism 32 function in a usual and ordinary manner to provide information regarding indicated air speed. This much of the instrument may be considered conventional as far as functional utility is concerned.

An additional dial 56 is mounted in part 38, and it has a central opening 60 through which needle shaft 36 extends. Dial 56 is preferably located behind face 52 so that the graduations 62 of dial 56 are located on a circle having a greater radius than the circle containing the graduations of indicated air speed face 52. Pointer 50 is made sufficiently long to tranverse graduations 62 simultaneously with the movement of the needle over the graduations of face 52.

Dial 56 is subjected to the possibility of continual adjustment in accordance with atmospheric conditions, and this is achieved by the functioning of the transducers 14 and 16. Electric circuit 20 includes motor 21 which operates in the clockwise or counter-clockwise directions in accordance with the sense of the signal produced by transducer 14. Electric motor 23 is a part of the circuit 22, and the power output shaft 25 thereof operates clockwise or counter-clockwise in accordance with the sense of the signal produced by the pressure transducer 16. The motions of shaft 25 and shaft 19 of motor 21 are corrective motions for dial 56 with the correction responding to the outputs of the temperature transducer and pressure transducer respectively.

There are positive gear means 68 for summarizing the output motions of shafts 19 and 25, and these summarizing means couple shafts 19 and 25 with dial 56. Summarizing means 68 may assume a number of configurations, a very satisfactory one having an idler gear 70 mounted freely on bearing 34 and held against axial movement on the bearing by means of boss 46 and a stop collar 72 attached to the bearing 34. Drive gear 74 is secured to the shaft 19 of motor 21 and is enmeshed with the idler gear 70. A planetary gear group 76 is connected to shaft 25. The planetary gear group is made of an input ring gear 80 with external teeth engaging the teeth of idler gear 70, and internal teeth with which a plurality of planet pinions 82, 84 and 86 (FIGURE 4) are engaged. Input sun gear 88 is concentrically mounted within the ring gear 80 and engages the inner peripheries of the pinions 82, 84 and 86 which are arranged with their axes of rotation on a circle which is also concentric with ring gear 80. Since sun gear 88 is secured to shaft 25, operation of the motor 23 will cause an operation of the planetary gear group 76, and this operation will be discussed more fully subsequently.

There are means drivingly connecting the planetary gear group 76 with dial 56, and these means preferably consist of a number of brackets 90 fixed to the rear surface of dial 56 and attached to a gear 92 mounted for free turning rotation on bearing 34. Gear 92 is enmeshed with a planet carrier gear 94, and this gear has three shafts 95, 96, and 97 (FIGURE 4) rotatably mounted therein. Shafts 95, 96 and 97 have their axes arranged on a circle concentric with gear 94, and the previously mentioned pinions 82, 84 and 86 are secured to the three shafts 95, 96 and 97.

Two indices 100 and 102 (FIGURE 2) representing V1 and V2 are mounted for adjustment by the pilot for the pilot's convenience and speed limit indicators. The indices may be formed as small pointers at the periphery of face 52 and formed at the outer extremities of arms 104 and 106 mounted for rotation on bearing 34 but frictionally held in a selected position of adjustment. Although the indices were mentioned as adjustable by the pilot for any desired speed limits to be observed, this would apply to pilot-owners and for the most part they would be adjusted by a technician to give critical engine speed and minimum control speed for critical engine operation. The advantage of having an adjustment is that one instrument 10 may be made for all aircraft, and the indices 100 and 102 adjusted to suit the particular aircraft.

A condition or certain condition pointer 110 is adjustably mounted in part 38 of case 12 so that it will be readily visible from the front of the instrument. This pointer may assume a number of configurations, one of which is simply a colored area as shown in FIGURE 2, on a ring gear 112 mounted for constrained, rotational movement in a circular groove 114 formed in the outer cylindrical wall of case part 38. Adjustment of the condition pointer 110 may therefore be made to any desired air speed position with respect to dial 52 so as to provide a more readily perceived reference with respect to which the air speed pointer 50 may become aligned to signal the pilot that a particular air speed condition has been attained. For example, at some preselected air speed it may be desirable to increase altitude.

The certain condition pointer 110 is therefore readable with the pointer 50 (FIGURE 2) and is adjustable externally by turning knob 116 having a knob shaft 118 attached to it. The knob shaft is mounted for rotation in bearings in case part 38, and has a gear 120 attached to it and in engagement with the external teeth of ring gear 112. It is quite evident that if movement of the certain condition pointer 110 is desired in a clockwise direction in response to clockwise turning of knob 116, an idler gear and shaft may be interposed between gear 120 and ring gear 112.

A portion of the operation of the instrument has been described. The conventional air speed mechanism 32, needle shaft 36 and pointer 50 together with face 52 function in response to the ordinary and usual operation of a conventional air speed mechanism to yield information regarding indicated air speed. Since dial 56 is displaced in accordance with temperature changes which are accompanied by changes in air density and is also displaced in accordance with static pressure changes reflecting altitude changes, the dial 56 is ideally suited for mounting graduations 130 yielding density altitude index values. A window 132 is therefore formed in the face of fixed dial 52 to expose the density altitude graduations 130, and a suitable pointer 134 may be placed on the stationary face 52 to provide a reference for reading the graduations 130. This information is particularly useful for take-off distance determinations as hereinbefore indicated.

Furthermore, since the conventional air speed mechanism 32 is a commercially available device, it is to be understood that various different types of air speed mechanisms 32 may be used. In fact, an unusual type employing Pitot static pressure, would be a differential pressure transducer somewhat like transducers 14 and 16 and including a servo motor like motors 21 and 23 and an electric circuit with the transducer and circuit capable of turning shaft 36 in accordance with indicated air speed.

In assembling improvement producing features of the instrument, it is understood that the manufacturer has the true air speed dial 56 attached to gear 92, and that the true air speed dial and indicated air speed face are in line with each other so that the front face of the instrument presents the dial and face to the pilot for easy inspection. All gears are enmeshed at this point, and the temperature transducer 14 and its matching motor 21 are tuned in at a particular temperature, for instance 15 degrees C. The pressure-altitude transducer 16 and its matching motor 23 are tuned by a technican at a pressure altitude of 29.92 inches of mercury which is the air pressure at sea level. Shafts 19 and 25 are coupled with the summation means 68 and the various parts are all in proper alignment with the face and dial and pointer reading properly just as though there were no temperature change or pressure change ever going to exist.

If ambient temperature and if static atmosphere pressure did not change, the face 52 and dial 56 would retain a fixed relationship to each other and the pilot would be able to read indicated air speed and true air speed which would have the same value. This condition seldom exists.

Accordingly, transducer 14 constantly senses temperature, and a change from the 15 degrees C. setting will cause motor 21 to function. The pressure-altitude transducer 16 constantly determines any changes from the original setting of 29.92 inches of mercury. Both transducers cause a compensation reflected in a movement of dial 56 in a proper amount so that the dial reads true under the same pointer 50 as the indicated air speed on face 52.

Considering several examples will show specifically how the mechanical movements are achieved. For the first example it is assumed that the indicated air speed is 100 knots shown under the pointer 50. If surface temperature is 15 degrees C. and the pressure is 29.92 inches of mercury, the indicated air speed and true air speed are each 100 knots.

Assume now that the aircraft climbs to 5000 feet above sea level. The pressure altitude transducer 16 senses pressure reduction and generates an electrical signal to operate motor 23, and this rotates gear 88 of planetary gear groups 76. The pinions of this group are connected directly to drive gear 94 by way of the pinion shafts which transfer the rotational movement of shaft 25 to gear 92 and consequently dial 56. Accordingly, the necessary compensation in adjustment of dial 56 is accomplished and the indicated air speed will still read 100 knots, but the true air speed will show 109.5 knots.

Assume now that the aircraft is at 5000 feet and all of the gears have stopped as though everything is in balance at 5000 feet. The surface temperature is 15 degrees C. and now at 5000 feet the air temperature is dropping at the normal adiabatic lapse rate to 5 degrees C. This is a 10 degree drop in temperature, and the temperature sensing transducer 14 senses this and causes an electric signal to be generated to operate motor 21. Gears 74 and 70 transfer this rotational movement to the ring gear 80 of the planetary gear group 76 which, in turn with its inside teeth, transfers this movement to the pinions, as drive gear 88 is now stationary since motor 23 will not permit it to turn. Consequently, the rotational movement of the pinions will have an orbital movement about the longitudinal axis of shaft 25 causing shafts 95, 96 and 97 to transfer this movement to gear 94 and then to gear 92. Movement of gear 92 turns dial 56. The indicated air speed will still be 100 knots, but now the true air speed dial 56 has been rotationally adjusted so that the pointer 59 will read 107.5 knots. The above described two operations may happen simultaneously or separately, and they may be clockwise or counter-clockwise in rotational movement causing an adding or subtracting effect in summarizing these rotational movements.

The most complicated situation that can be experienced is when the transducers 14 and 16 demand simultaneous adjustment i.e. motors 21 and 23 are simultaneously rotating. Spoken otherwise, gears 74 and 88 are required to rotate simultaneously. In this situation ring gear 80 and drive gear 88 rotate in the same direction and carry the non-rotating pinions therewith, so that the pinions, ring gear and drive gear 88 rotate as a unit, still transferring the total rotation to gear 94 by way of the pinion shafts 95, 96 and 97. It is evident that if the rates of rotation are different the speeds of gears 94 and 88 are different, and the difference will result in some walking of the pinions around the interior of ring gear 80 so that the described means 68 produce an out at gear 94 and consequently gear 92 which is the algebraic sum of the inputs taken into consideration clockwise and counter-clockwise (plus and minus) rotations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A continuous direct reading true air speed instrument comprising a casing, a graduated true air speed dial movably mounted in said casing for continuous corrective movement with respect to a fixed member of an indicated air speed mechanism having a needle shaft provided with a pointer movable adjacent to said dial and fixed member, temperature responsive transducing means, pressure responsive transducing means, and means drivingly connected with both of said transducing means for positively summarizing the outputs thereof and accordingly adjusting said dial by movement of the dial with respect to said pointer proportional to the summary.

2. The combination of claim 1 wherein there are indices located adjacent to said fixed member and movable to selected positions with reference to said fixed member.

3. The subject matter of claim 1 wherein there is a certain condition indicator adjacent to said true air speed dial, and manual means connected with said certain condition indicator for adjusting said certain condition indicator with respect to said fixed member to establish a reference location for said pointer.

4. The combination of claim 1 wherein there are indices located adjacent to said fixed member and movable to selected positions with reference to said fixed member, said fixed member having an opening therein, density-altitude graduations on said true air speed dial and located in opposition to said opening to read said density-altitude graduations.

5. The direct reading true air speed instrument of claim 1 wherein said summarizing means include a drive gear, an idler gear enmeshed therewith, a planetary gear group drivingly connected with said idler gear, and means drivingly connecting said planetary gear group with said dial.

6. The instrument of claim 5 wherein said drive gear is connected to said temperature responsive means, said planetary gear group having a ring gear with external teeth engaging said idler gear and inner teeth, pinions engaging said inner teeth, and shafts connected with said pinions.

7. The instrument of claim 6 wherein said means drivingly connecting said planetary gear group with said dial comprises a gear attached to said pinion shafts, and another gear secured to said dial and engaged with the last mentioned gear.

8. In an aircraft air speed indicator, a circular stationary dial provided with an indicated air speed scale at its margin, a pointer rotatably mounted for angular movement around the center of said stationary dial, a continuously moveable dial rotatably mounted adjacent said stationary dial concentrically therewith, a true air speed scale on said movable dial, a scale indicator and a density-altitude scale respectively mounted on said stationary and movable dials and located adjacent each other, said density-altitude scale being formed and arranged so that continuous corrective displacement of said movable dial relative to the scale indicator responsive to temperature and altitude pressure changes may be measured simultaneously with said corrective displacement of said true air speed scale relative to said indicated air speed scale, said true air speed scale being calibrated to continuously provide a corrected air speed indication relative to said pointer in accordance with automatic displacement thereof in response to temperature and altitude pressure changes.

9. In combination with an uncompensated air speed indicator having a fixed dial and a pointer rotatable with respect thereto for directly reading indicated air speed, compensating dial means movably mounted with respect to said fixed scale and pointer for continuous corrective displacement in accordance with a plurality of atmospheric condition changes, a plurality of atmospheric condition sensing mechanisms operative independently of the uncompensated speed indicator and having continuously variable displacement outputs, positive summation means operatively connecting said sensing mechanisms to the dial means for continuous corrective displacement thereof as an algebraic function of all of said variable displacement outputs.

10. The combination of claim 9, wherein said dial means mounts a true air speed scale for intersection by said pointer to directly read compensated air speed.

11. The combination of claim 9, wherein said fixed dial and compensating dial means mount atmospheric condition indicating means operative in response to displacement of the dial means from a reference position with respect to the fixed dial to provide an index of atmospheric conditions.

12. The combination of claim 9, wherein said positive summation means comprises, positive planetary gear means having planet pinions rotatably mounted on a planet gear carrier and meshing with input gears, means drivingly connecting said input gears to the sensing mechanisms for independent and positive displacement thereof and means drivingly connecting said carrier to the dial means for corrective displacement thereof.

13. The combination of claim 10, wherein said fixed dial and compensating dial means mount atmospheric condition indicating means operative in response to displacement of the dial means from a reference position with respect to the fixed dial to provide an index of atmospheric conditions.

14. The combination of claim 11, wherein said positive summation means comprises, positive planetary gear means having planet pinions rotatably mounted on a planet gear carrier and meshing with input gears, means drivingly connecting said input gears to the sensing mechanisms for independent and positive displacement thereof and means drivingly connecting said carrier to the dial means for corrective displacement thereof.

References Cited in the file of this patent
UNITED STATES PATENTS

| | | |
|---|---|---|
| 2,452,621 | Weissenbach | Nov. 2, 1948 |
| 2,638,782 | Leach | May 19, 1953 |
| 2,682,768 | White | July 6, 1954 |
| 2,706,407 | Hosford | Apr. 19, 1955 |
| 2,842,091 | Kennedy | July 8, 1958 |
| 2,941,400 | Nesbitt | June 21, 1960 |